United States Patent [19]

Morisawa

[11] Patent Number: 4,547,052

[45] Date of Patent: Oct. 15, 1985

[54] MECHANISM FOR CHARGING THE MIRROR AND SHUTTER IN A VIDEO STILL CAMERA

[75] Inventor: Tahei Morisawa, Tokyo, Japan

[73] Assignee: Asahi Kogaku Kogyo Kabushiki Kaisha, Tokyo, Japan

[21] Appl. No.: 597,109

[22] Filed: Apr. 5, 1984

[30] Foreign Application Priority Data

Apr. 30, 1983 [JP] Japan ................................. 58-77158

[51] Int. Cl.[4] ............................................. G03B 19/12
[52] U.S. Cl. .................................... 354/152; 358/225
[58] Field of Search ............ 354/152, 153, 156, 173.1, 354/173.11; 358/225, 335, 906

[56] References Cited

U.S. PATENT DOCUMENTS

| 3,967,298 | 6/1976 | Adamski | 354/152 |
|---|---|---|---|
| 4,204,759 | 5/1980 | Yamada et al. | 354/152 |
| 4,441,800 | 4/1984 | Nakano | 354/173.1 |
| 4,443,083 | 4/1984 | Nakano | 354/152 |

Primary Examiner—A. A. Mathews
Attorney, Agent, or Firm—Hill, Van Santen, Steadman & Simpson

[57] ABSTRACT

A mechanism for charging a mirror and a shutter in a video still camera having a charging motor, including a driving pin mounted eccentrically on a final speed reducing gear drivable by the charging motor, a mirror charging lever actuatable by the driving pin for charging the mirror during an initial period of a single revolution of the final speed reducing gear, and a shutter charging lever actuatable by the driving pin for charging the shutter while the mirror is being charged by the mirror charging lever. The mirror is completely charged prior to completion of the charging of the shutter.

6 Claims, 9 Drawing Figures

MECHANISM FOR CHARGING THE MIRROR AND SHUTTER IN A VIDEO STILL CAMERA

BACKGROUND OF THE INVENTION

The present invention relates to a mechanism for charging the mirror and shutter in a video still camera which uses a magnetic recording disk instead of a film as recording medium.

The recent trend in a photographic camera is toward an automatic film winding camera having a motor contained therein for automatically cocking, or charging, a shutter and a mirror and winding a film as soon as the shutter is released to complete an exposure. Recently a video still camera, which uses a magnetic recording disk instead of a film as a recording medium, has been developed. Video still cameras are free from the need for film winding unlike a photographic camera, but require the shutter and mirror to be charged like a photographic camera. In the video still camera there are three methods of charging the shutter and the mirror. One method is to charge the mirror and the shutter at the same time. According to another method, the shutter is charged after the mirror has been charged. In still another method the shutter charge is initiated while the mirror charge is being charged. FIGS. 1 through 3 of the accompanying drawings illustrate the relationship between time and a load imposed on the motor in the above three charging methods, the horizontal axis being indicative of time t and the vertical axis being indicate of required motor force P. When the mirror and the shutter are simultaneously charged as indicated by the lines (a), (b), respectively, in FIG. 1, the load imposed on the single motor is increased. This mode requires an increased number of speed reducing gears in order to increase a speed reduction ratio for the motor power, and hence the power transmission efficiency is reduced. Use of two motors would speed up the film winding, but would result in an increased cost and be difficult to implement due to the limited space available in the camera. When the shutter is charged as indicated by the line (b) in FIG. 2 after the mirror has already been charged as shown by the line (a), the speed reduction ratio may be small, but the time it takes for the mirror and the shutter to be fully charged is longer. Attempts to shorten the charging time would reduce the mechanical strength, particularly durability, of the members to be charged.

The third method, in which initiation or charging of the shutter occurs while the mirror is being charged as shown in FIG. 3, is advantageous over the former two methods in that the load exerted on the motor when the latter starts being energized is low, and hence the shutter and the mirror can be charged smoothly; no additional gears are necessary for the purpose of increasing the speed reduction ratio, and the members to be charged have an improved degree of durability.

SUMMARY OF THE INVENTION

With the foregoing prior problems in view, it is an object of the present invention to provide a mechanism of a simple construction for charging the shutter while the mirror is being charged and providing completion of the mirror charging prior to completion of the shutter charging in a video still camera.

According to the present invention, there is provided a mechanism for charging a mirror and a shutter in a video still camera having a charging motor including a driving pin mounted eccentrically on a final motor speed reducing gear, a mirror charging lever actuatable by the driving pin for charging the mirror during an initial period of a full revolution of the final speed reducing gear, and a shutter charging lever actuatable by the driving pin for charging the shutter while the mirror is being charged by the mirror charging lever. The mirror is completely charged before the shutter is fully charged.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
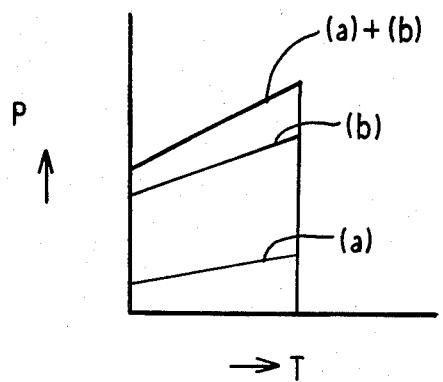
FIG. 1 is a graph showing the manner in which a mirror and a shutter are simultaneously charged.
Figure 2:
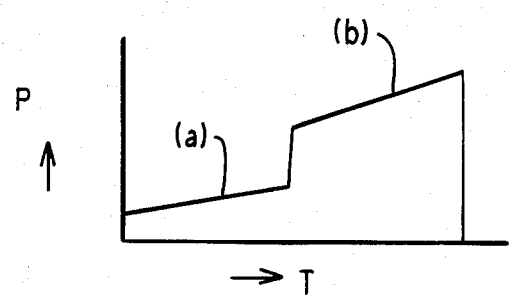
FIG. 2 is a graph showing the manner in which a mirror is first charged and thereafter a shutter is charged.
Figure 3:
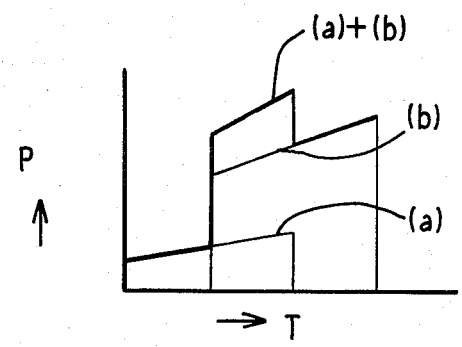
FIG. 3 is a graph illustrative of the manner in which a shutter is charged in the process of charging a mirror.
Figure 4:
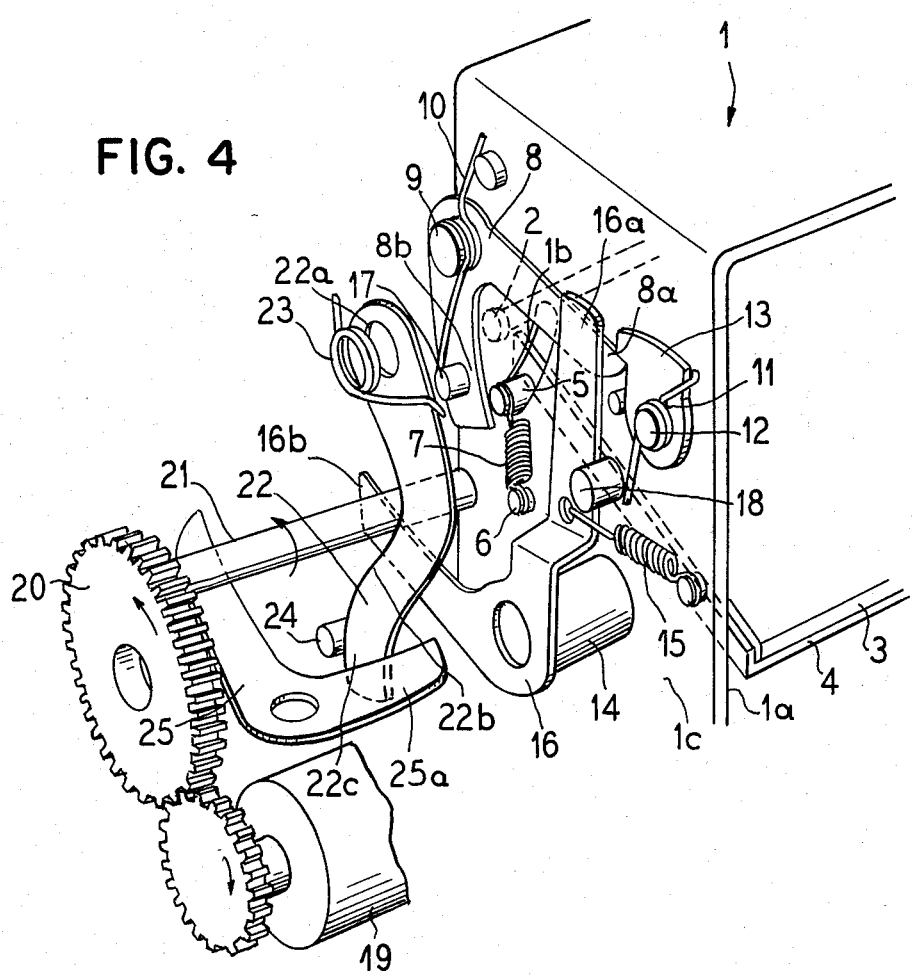
FIG. 4 is a perspective view of a mechanism for charging the mirror and shutter of an electronic single-lens reflex camera according to the present invention.

As shown in FIG. 4, a mirror box 1 has an inner wall 1a on which a mirror sheet shaft 2 is mounted. A mirror sheet 4 holding a mirror 3 is supported on the mirror sheet shaft 2 for vertical angular movement from an inclined position at an angle of 45 degrees to an optical axis (not shown) to a horizontal position. A mirror actuating pin 5 is attached to a side edge of the mirror sheet 4 and projects out of the mirror box 1 through a slot 1b defined in the mirror box 1. The mirror sheet 4 is normally urged to turn clockwise toward the inclined position by a mirror return spring 7 engaging the mirror actuating pin 5 and a pin 6 mounted on an outer wall 1c. A mirror actuating lever 8 for causing the mirror actuating pin 5 to raise the mirror 3 is pivotally mounted at shaft 9 on the outer wall 1c and normally urged to turn counterclockwise under the force of a spring 10. The mirror actuating lever 8 has an end 8a engageable with an engaging lever 13 which is normally urged by a spring 11 to turn counterclockwise about a shaft 12.

A bifurcated mirror charging lever 16 is pivotally mounted at shaft 14 on the outer wall 1c and is normally urged by a spring 15 to turn clockwise about the shaft 14. The mirror charging lever 16 includes an arm 16a engageable with a pin 17 mounted on the mirror actuating lever 8 and a pin 18 mounted on the outer wall 1c, and an arm 16b engageable with a driving pin 21 secured eccentrically to a driving gear drivable by a charging motor 19, the driving gear 20 serving as a final speed reducing gear. When the driving pin 21 is held out of abutting engagement with the arm 16b the arm 16a is turned under the biasing force of the spring 15 into abutment against the pin 18. When the driving pin 21 is turned in the direction of the arrow into abutment against the arm 16b, the mirror charging lever 16 is turned counterclockwise about the shaft 14 to enable the arm 16a to push the pin 17 until the mirror actuating lever 8 is engaged by the engaging lever 13.

A first shutter charging lever 22 is pivotally mounted at a hole 22a on a shaft (not shown) and positioned in the range of angular movement of the driving pin 21. The first shutter charging lever 22 is normally urged by a spring 23 to turn clockwise. When the driving pin 21 is held in abutment against a substantially intermediate portion 22b of the first shutter charging lever 22, the latter is prevented from being angularly moved. When the driving pin 21 is out of abutment against the second shutter charging lever 22, the latter is turned until its distal end portion 22c is held against a stopper 24. A second shutter charging lever 25 is pivotally mounted on a shaft (not illustrated) and normally urged by a spring (not shown) to turned counterclockwise (as shown in FIG. 4) about the shaft. The second shutter charging lever 25 has an end 25a held against the first shutter charging lever 22 at all times. When the second shutter charging lever 25 is pushed by the first shutter charging lever 22 to turn clockwise, a shutter (not shown) is charged by the second shutter charging lever 25.

Figure 5:
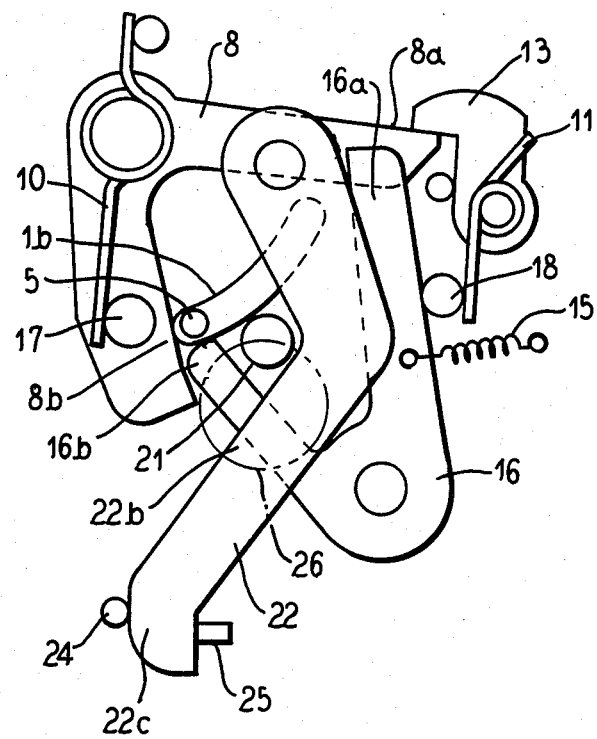
FIGS. 5 through 9 are side elevational view of the mechanism, illustrating progressive steps of operation of the mechanism.
Figure 6:
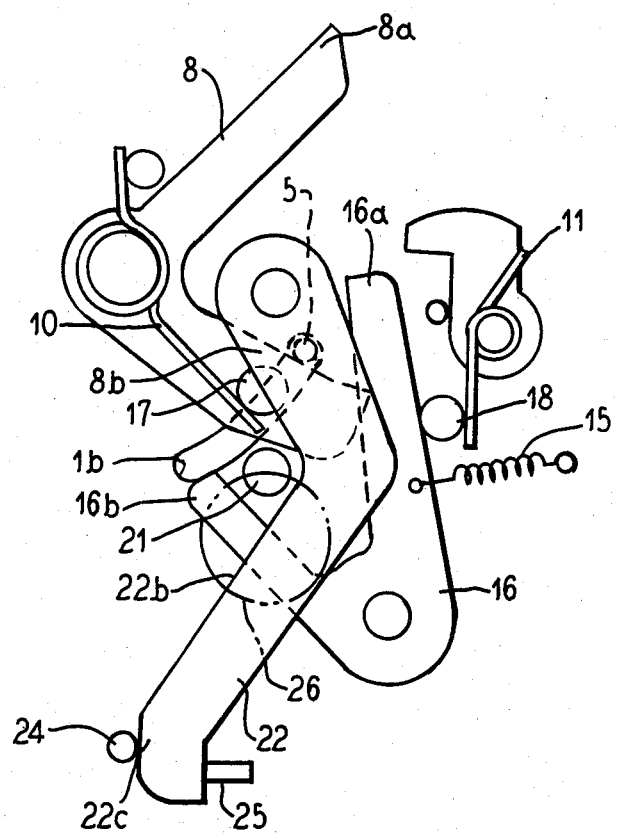
Figure 7:
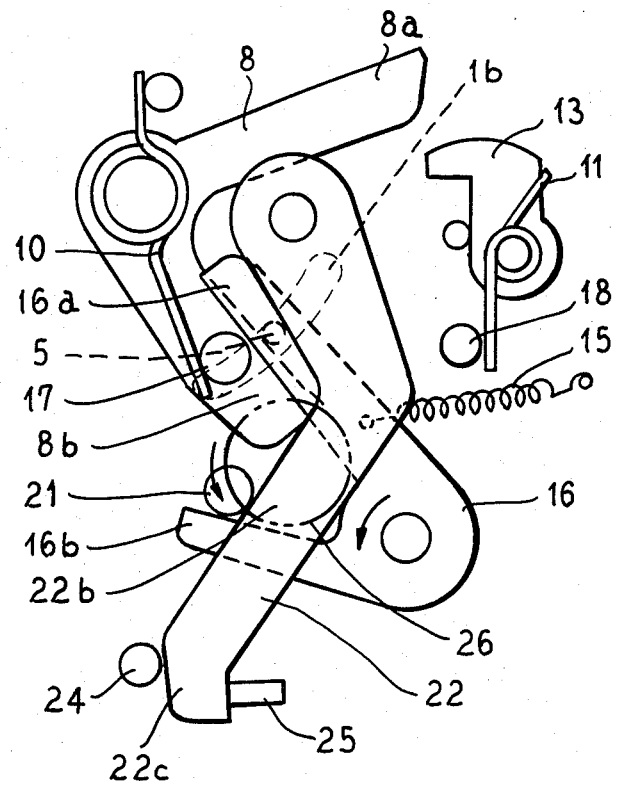
Figure 8:
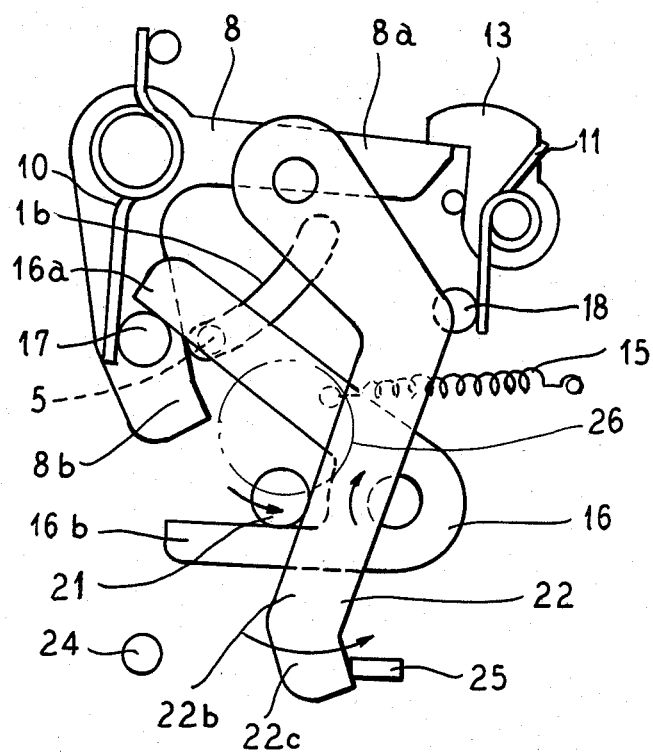
Figure 9:
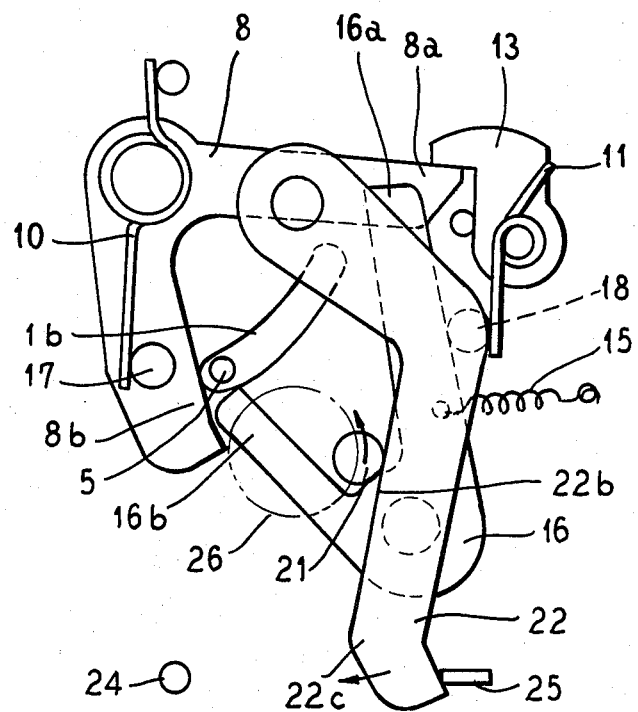

The charging mechanism thus constructed will operate as follows:

FIG. 5 shows the position in which the mirror and the shutter have been charged. In this position, the end 8a of the mirror actuating lever 8 is engaged by the engaging lever 13, and the driving pin 21 remains out of engagement with the mirror charging lever 16 and the first shutter charging lever 22. When a release means (not shown) is actuated to cause the engaging lever 13 to disengage from the mirror actuating lever 8, the latter is spring-urged to turn counterclockwise to enable an opposite end 8d to push the mirror actuating pin 5 to lift the mirror 3, as shown in FIG. 6. When the lifting movement of the mirror 3 has been completed, the shutter is opened by a known means (not shown) to make an exposure. After the exposure has been completed, an exposure completion signal is applied by a control circuit (not shown) to the motor 19, which then starts rotating to enable the driving pin 21 to turn in the direction of the arrow (FIG. 4) along an orbital path 26 shown by the two-dot-dash line in FIG. 6 for thereby pushing the arm 16b of the mirror charging lever 16, so that the latter is turned counterclockwise against the biasing force from the spring 15. The arm 16a of the mirror charging lever 16 now presses the pin 17 on the mirror actuating lever lever 8 to turn the latter clockwise, thus starting to charge the mirror 3. At this time, since the mirror actuating lever 8 still remains out of abutment against the first shutter charging lever 22, the shutter is not charged. The mirror 3 which has been held in the upper horizontal position by the end 8b of the mirror actuating lever 8 is lowered by the mirror return spring 7 acting on the pin 5 (FIG. 7). FIG. 8 illustrated the position in which the driving pin 21 is turned further from the position of FIG. 7 to push the arm 16b of the mirror charging lever 16, and the end 8a of the mirror actuating lever 8 is engaged by the engaging lever 13 whereupon mirror charging is completed. At this time, the intermediate portion 22b of the first shutter charging lever 22 is pushed by the driving pin 21 to turn the first charging lever 22 counterclockwise for thereby causing the second shutter charging lever 25 to charge the shutter. As the driving pin 21 is further turned from the position of FIG. 8, the driving pin 21 is disengaged from the arm 16b of the mirror charging lever 16, which is then released to turn clockwise under the resiliency of the spring 15 until the arm 16a is retracted into engagement with the pin 18 so that the arm 16a will not interfere with the pin 17 on the mirror actuating lever 8 when the latter is moved to lift the mirror 3, as shown in FIG. 9. As the driving pin 21 is further turned from the position of FIG. 9, the first shutter charging lever 22 is turned clockwise until the end 22c is brought into abutment against the stop 24, whereupon the second shutter charging lever 25 is turned counterclockwise (as shown in FIG. 4) so as to be retracted into a position out of interference with a next shutter operation. The parts are now returned to the position illustrated in FIG. 5.

With the mechanism for charging the mirror and shutter of the video still camera according to the present invention, the mirror and the shutter are completely charged while the driving pin mounted off center on the final speed reducer gear makes one revolution. The mirror first starts being charged, and then the shutter starts being charged while the mirror is being charged. Therefore, the load imposed on the motor at the time the latter begins to be energized is relatively small, and the mirror and the shutter can be charged smoothly utilizing the dynamic characteristics of the motor. No additional gears for an increased speed reduction ratio will be required, and the members to be charged will have an increased degree of durability.

Although a certain preferred embodiment has been shown and described, it should be understood that many changes and modifications may be made therein without departing from the scope of the appended claims.

I claim as my invention:

1. A mechanism for charging a mirror and a shutter in a video still camera comprising:
    (a) a charging means
    (b) a final speed reducing gear drivable by the charging means;
    (c) a driving pin mounted eccentrically on said final speed reducing gear;
    (d) a mirror charging lever actuatable by said driving pin for charging the mirror during an initial period of a single revolution of said final speed reducing gear; and
    (e) a shutter charging lever actuatable by said driving pin for charging the shutter while the mirror is being charged by said mirror charging lever, such that the mirror is completely charged prior to completion of the charging of the shutter.

2. A mechanism according to claim 1, wherein said mirror has a mirror actuating pin, said mirror charging lever having a first arm engageable with said mirror actuating pin and a second arm engageable with said driving pin.

3. A mechanism according to claim 1, wherein said driving pin revolves in an orbital path when said final speed reducing gear is rotated, said mirror charging lever and shutter charging lever being engageable by said driving pin at different positions in said orbital path.

4. An overlapping sequential mirror and shutter cocking mechanism for comeras comprising:
    (a) a spring biased mirror moveable against the spring bias into a cocked condition;
    (b) a spring-biased shutter movable against the spring bias into a cocked condition;

(c) a moveable abutment following a cyclical path and moved to first move said mirror toward cocked condition and then move said shutter toward cocked condition before said mirror reaches its cocked condition.

5. The structure of claim 4 wherein said abutment moves in a generally circular path.

6. The structure of claim 4 wherein said abutment is moved by a motor operable following unlocking of the shutter from its cocked condition.

* * * * *